Jan. 14, 1969     JAMES E. WEBB     3,421,541
ADMINISTRATOR OF THE NATIONAL AERONAUTICS
AND SPACE ADMINISTRATION
RELIEF VALVE
Filed Nov. 27, 1967
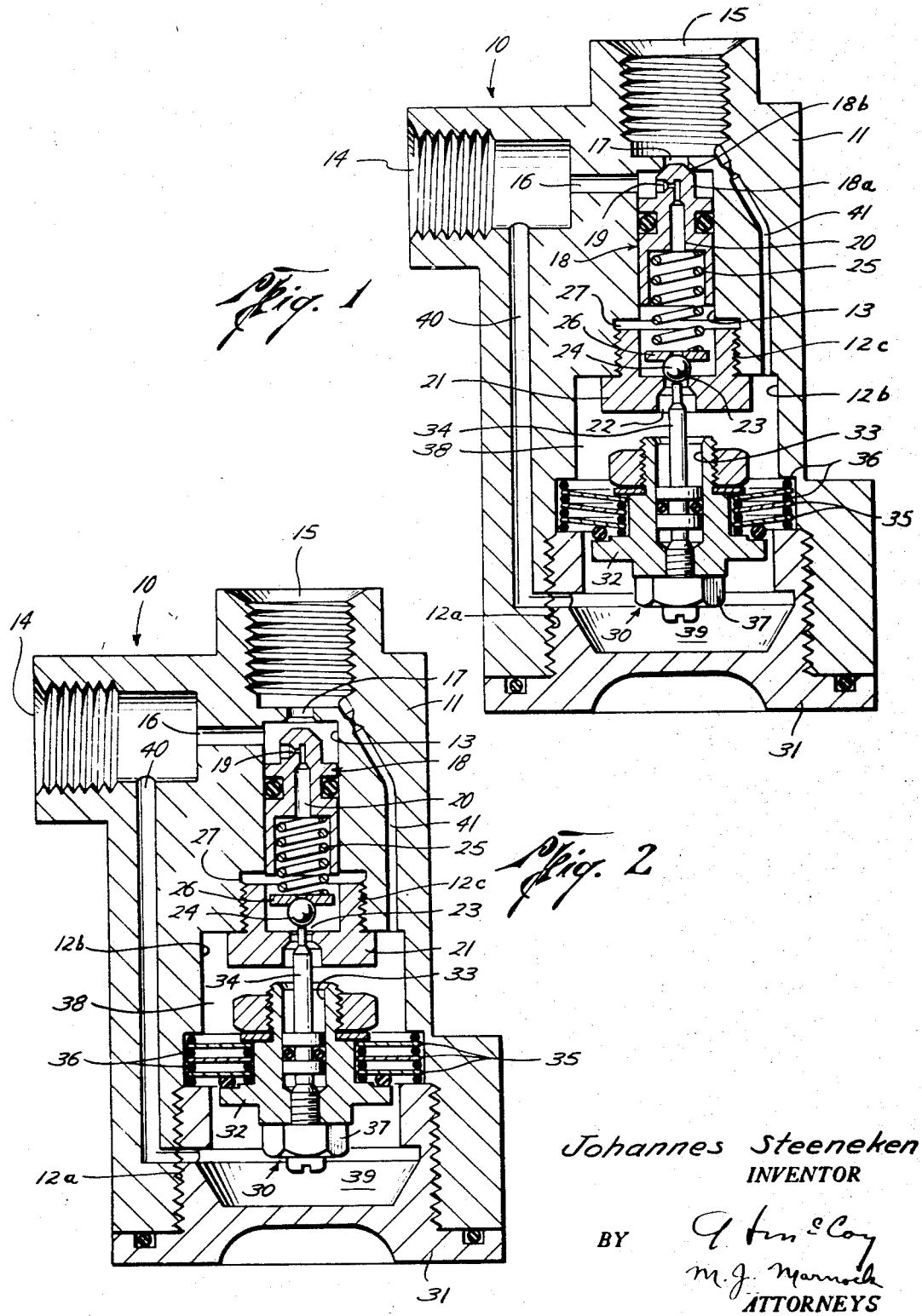
Johannes Steeneken
INVENTOR
BY
ATTORNEYS United States Patent Office 3,421,541
Patented Jan. 14, 1969

3,421,541
RELIEF VALVE
James E. Webb, Administrator of the National Aeronautics and Space Administration, with respect to an invention of Johannes Steeneken, Manhattan Beach, Calif.
Filed Nov. 27, 1967, Ser. No. 685,766
U.S. Cl. 137—491    5 Claims
Int. Cl. F16k *31/12;* F16k *31/145*

ABSTRACT OF THE DISCLOSURE

A pressure relief valve which permits a slow bleed rate at one pressure level and a higher bleed rate at a higher pressure level. The valve mechanism comprises a housing having an internal bore in which is slidably mounted a hollow sleeve valve element. The sleeve valve normally closes off flow between the inlet port and a flow passage leading to the outlet port. An orifice in the sleeve valve element communicates the inlet pressure with a ball valve also mounted in the housing bore and which also shuts off flow to the outlet through a second flow passage. A single spring biases the sleeve valve and ball valve elements to closed positions. A Belleville spring diaphragm assembly, also mounted in the housing bore, senses pressure differential between inlet and outlet ports and deflects at a predetermined inlet pressure to unseat the ball valve and permit a slow pressure bleed to maintain system pressure within acceptable limits. Should a far greater inlet pressure occur, the restriction in flow through the orifice in the sleeve valve element creates a pressure differential across the sleeve valve element which acts against the spring bias to unseat the sleeve valve and permit a much higher bleed rate.

The invention described herein was made in the performance of work under a NASA contract and is subject to the provision of section 305 of the National Aeronautics and Space Act of 1958, Public Law 85–568 (72 Stat. 435); U.S.C. 2457.

*Background of the invention*

The present invention relates to a valve mechanism, and more particularly to a pressure relief valve mechanism which is capable of precisely controlling the upper limit of pressure in a fluid system wherein the upper limit of pressure is critical.

The valve of this invention is particularly useful for operation in cryogenic fluid systems. A typical system commonly used aboard spacecraft, for example, is a fuel cell reactants supply system in which hydrogen and oxygen are stored as cryogenic fluids and supplied as fuel cell reactants for a power generating means. To optimize the use of these fluids, the performance of the cryogenic storage and supply systems must be designed to very close performance limits. The lower pressure limit is usually controlled by a pressure switch which energizes a heater device to build pressure in the cryogen storage container whenever the lower pressure limit is reached. The upper limit is controlled by a pressure relief valve.

For a valve to properly function as a control for cryogen supply systems, it must be capable of controlling excess pressure in the system which develops during periods of low cryogen consumption. This excess pressure results from the temperature rise associated with normal heat leak into the cryogenic vessel. To control this excess, the valve has to operate at, and control, the upper limit of the operational pressure range of the system. Also, since leakage of cryogen cannot be tolerated even at a pressure slightly lower than the upper limit of this range, the valve has to seal perfectly when the pressure is slightly less or substantially at the limit pressure. Should an emergency occur, either by failure of an internal heater to de-energize or by loss of vacuum in the insulative system of the storage vessel, a relatively high flow at higher pressure has to pass through the valve in order to maintain the integrity of the vessel and the cryogenic system. In a typical system, the minimal excess flow of cryogenic oxygen which results from normal heat leak is approximately 11 s. cc./hr., whereas a maximum flow during emergency conditions can be expected to approximate $9.16 \times 10^6$ s. cc./hr. The pressure range in which the valve must operate to accommodate conditions of minimum excess flow and maximum excess flow is approximately 5% of maximum operational pressure, as for example a range of 50 p.s.i. when the maximum operational pressure is 1000 p.s.i.a. Conventional relief valves are unable to meet these exacting requirements, especially within the limitations of size and weight that are imposed for spaceflight applications.

*Summary*

The pressure relief valve of this invention, which has been devised to circumvent the attendant disadvantages of conventional relief valves, includes a housing body having inlet and outlet ports and an internal bore in which is slidably mounted a hollow sleeve valve element. The sleeve valve normally closes off fluid flow between the inlet and a flow passage leading to the outlet port. The inlet pressure is communicated through an orifice in the sleeve valve element with a ball valve also mounted in the housing bore and which is normally closed to shut off fluid flow to the outlet port through a second flow passage. A single coiled spring biases the sleeve valve element and the ball valve element to closed seated positions. A Belleville spring diaphragm assembly is also mounted in the internal bore in the housing and is sensitive to the pressure differential between inlet and outlet ports by means of flow passages which communicate the inlet and outlet pressures to opposite sides of the diaphragm. The diaphragm assembly which carries an adjustable stem, deflects in response to a predetermined inlet pressure whereby the stem unseats the ball valve to permit a slow pressure bleed thereby maintaining the system pressure within its acceptable operating limits. Should a far greater inlet pressure occur, as might arise under emergency conditions, the restriction in flow through the orifice in the sleeve valve element creates a pressure differential across the sleeve valve element which acts against the spring bias to unseat the sleeve valve and permit fluid flow to the outlet port at a much greater rate.

Like ordinary relief valves which are basically protective devices and do not take part in the operation of the system which they are protecting, the valve of this invention actually functions as part of the pressure controls. The stem which is carried by the diaphragm assembly is adjustably positionable whereby the predetermined pressure level at which the ball valve is unseated can be readily changed if desired.

The actual construction, operation, and apparent advantages of the invention will be better understood by referring to the drawings in which like numerals identify like parts and in which:

*Brief description of the drawings*

FIG. 1 is a cross-sectional view of the present invention with the valve in a fully closed position; and FIG. 2 is a cross-sectional view of the present invention with the valve in a fully opened position.

*Description of the preferred embodiment*

Referring more particularly to the figures, valve assembly 10 is comprised of a body 11 having a longitudinally extending bore therethrough which is formed of contiguous portions of successively smaller diameter including an enlarger bore section 12a which is threaded from one end of the body 11 throughout a portion of its extent, an intermediate smooth-walled section 12b of lesser diameter, a threaded section 12c, and a smooth-walled reduced bore section 13. Body 11 has an inlet port 14 in the side thereof, and an outlet port 15 at one end, both of which communicate with the upper end portion of reduced bore 13 by means of passages 16, 17, respectively. Slidably mounted in reduced bore 13 is a sleeve valve element 18 which has an orifice 19 in the side thereof and which communicates with a coaxial bore 20 formed in the valve element from the lower end thereof. The orifice 19 is formed in a reduced diameter portion 18a of the valve element 18 adjacent its tapered upper end section 18b and is always in communication with the passage 16 and inlet port 14.

Threadedly secured to the body 11 within threaded bore section 12c is fitting 21. A central opening 22 provided in fitting 21 terminates in valve seat 23 on which is normally positioned a ball valve element 24. A coil spring 25 which extends into an enlarged section of the bore 20 in valve element 18 is positioned to extend axially between sleeve valve element 18 and a retainer 26 which rests directly on ball valve element 24. The bore 20 in valve element 18 and the portion of the bore 13 between the fitting 21 and valve element 18 form a relief valve chamber 27. As can readily be seen in the drawing, spring 25 biases the conical surfaced end 18b of valve element 18 into the passage 17 to thereby block flow through the passage to outlet 15 and also biases ball valve element 24 onto seat 23.

A diaphragm assembly 30 is mounted in enlarged bore section 12a and is held there in place by a threaded cap 31 which closes off the bore section 12a at the lower end of body 11. Assembly 30 comprises a support member 32 which has a coaxial bore 33 extending therethrough. Adjustable stem 34 is threaded into the bore 33 and extends through the support member 32. The length of stem that extends out of bore 33 can be readily adjusted, but it is so positioned that the end of stem 34 contacts ball valve 24 whenever diaphragm assembly 30 is deflected upward a predetermined amount to unseat ball valve 24. It can therefore be easily seen that by adjusting the length of stem 34 extending from the bore 33 it will take greater or less deflection of diaphragm assembly 30 to unseat ball valve 24. A lock nut 37 is provided for locking stem 34 in a selected position relative to the support member 32, as is well known in the art.

The support member 32 is itself supported in bore section 12a by means of Belleville springs 35 and appropriate seals 36, so that the chamber 38 formed in bore section 12b above assembly 30 is effectively sealed from the chamber 39 which is formed below the diaphragm assembly between the diaphragm assembly and the cap 31. Body 11 is also provided with a flow passage 40 which communicates inlet 14 with chamber 39 below the diaphragm assembly 30 and a flow passage 41 which communicates outlet portion 15 with chamber 38 directly above the diaphragm assembly. It will therefore be apparent that the diaphragm assembly 30 is sensitive to the pressure differential between the inlet and outlet ports.

In operation of the valve assembly 10, inlet port 14 is connected in fluid communication with a sensing port in a pressurized container (not shown) such as a container of cryogenic fluid in a cryogenic supply system which is designed to operate in a very narrow pressure range. The pressure within the container is communicated through inlet port 14 and passage 40 into the chamber 39 directly below diaphragm assembly 30. The inlet pressure also communicates through port 16 and orifice 19 in sleeve valve 18 into chamber 27 above ball valve 24. At the same time, the pressure at the outlet is communicated through outlet port 15 and flow passage 41 to the chamber 38 directly above diaphragm assembly 30.

Under normal conditions with the pressure in the cryogen container within the acceptable operating pressure range, valve assembly 10 will be in the closed position as shown in FIG. 1, i.e., both sleeve valve 18 and ball valve 24 will be seated. However, when the inlet pressure reaches a predetermined value representing the upper limit of the operational pressure range, the pressure differential between chambers 38 and 39 will be such that the pressure in chamber 39 will displace diaphragm assembly 30 upward until stem 34 displaces ball valve 24 from its seat 23, as shown in FIG. 2. The pressurized fluid in chamber 27 will then flow into chamber 38 and out passage 41 to the outlet port 15. When the inlet pressure is only slightly above the desired relief pressure as might normally result due to heat leak into the system, a slow bleed will occur through ball valve 24 to reduce the inlet pressure and maintain the system pressure within its acceptable operational limits. However, should the inlet pressure become substantially greater than the desired relief pressure, as might occur by failure of an internal heater in the cryogen storage container to de-energize or possibly by damage to the insulation system which envelops the cryogen container, the restricted flow of pressurized fluid through the small orifice 19 creates a substantial pressure differential between the passage 16 and the chamber 27. At a pressure differential across sleeve valve 18 as predetermined by the design of the valve element and the strength of spring 25, the valve element 18 moves downward against the bias of spring 25 and is unseated to allow full flow of the pressurized fluid through passages 16, 17, and the outlet port 15. However, as the pressure through inlet port 14 and chamber 39 reduces, diaphragm assembly 30 is deflected downward by Belleville springs 35, thereby retracting the stem 34 and allowing spring 25 to reseat ball valve 24. Flow through orifice 19 into valve element 18 increases the pressure in the valve chamber 27 and when pressure on both sides of valve element 18 is equalized, spring 25 reseats valve element 18.

It is therefore readily seen that the diaphragm assembly which is sensitive to the pressure differential between the inlet and outlet ports is responsive to a predetermined pressure level to unseat the ball valve element and permit a slow pressure bleed to maintain the cryogenic storage and delivery system within acceptable operating limits. The poppet valve element 18, on the other hand, is responsive to a higher pressure level as might occur in the event of an emergency to permit pressure relief at a much higher bleed rate. The principle of fluid amplification achieved by the greater effective diaphragm area as compared to the ball valve opening is expressed in a large ratio of main poppet travel to ball valve travel, and makes possible the use of a relatively high rate force balance system represented by the balancing diaphragm and valve spring assembly. The use of the diaphragm assembly and Belleville springs for controlling the opening of the ball valve considerably reduces problems of friction and vibration in the critical area of valve operation, and is a significant factor in improved reliability. In addition, the use of a single spring for biasing the ball valve element and the sleeve valve element to their seated positions permits the attainment of high seat load and low leakage without duplication of valve design which would increase the size of the valve assembly and, because of the larger number of parts, decrease reliability.

Obviously, modifications and variations of the present invention are possible in the light of the above teachings. It is therefore to be understood that within the scope of the appended claims, the invention may be practiced otherwise than as specifically described.

What is claimed and desired to be secured by Letters Patent is:

1. A pressure relief valve mechanism comprising:
 a body formed with an internal bore which is closed at one end of said body, said body having an inlet port and an outlet port communicating with said bore;

a hollow poppet valve element slidably mounted in said bore and normally positioned therein to block fluid flow from said inlet port to said outlet port;

a valve seat member having a valve opening therein and extending transversely across said bore and providing a pressure relief chamber between said valve seat member and said hollow poppet valve element, said body having a flow passage therein communicating said outlet port with said valve opening;

a ball valve element normally seated on said valve seat member and thereby closing off fluid communication between said pressure relief chamber and said flow passage;

a spring means resiliently urging said hollow poppet valve element and said second valve element to normally closed seated positions;

flow restrictive orifice means in said hollow poppet valve element communicating said inlet port with said pressure relief chamber;

means responsive to a predetermined level of inlet pressure to unseat said second valve element and permit fluid flow from the inlet port through said pressure relief chamber and flow passage to the outlet port at a relatively slow bleed rate, said latter mentioned means including a diaphragm means extending transversely across said bore and sensitive to the pressure differential between the pressures at said inlet and outlet ports and adapted to deflect in correspondence with the magnitude of said pressure differential; and a stem means carried by said diaphragm means for contacting and unseating said ball valve element at a degree of deflection of said diaphragm means corresponding to said predetermined level of inlet pressure, said stem means being adjustably mounted on said diaphragm means whereby it may be adapted to unseat the ball valve element at different levels of inlet pressure, and said poppet valve element having a surface area constantly exposed to said inlet pressure, whereby said flow restrictive orifice means is responsive to a level of inlet pressure higher than said predetermined level to induce a pressure differential across said hollow poppet valve element acting against the bias of said spring means to unseat said hollow poppet valve element and permit fluid flow from said inlet port to said outlet port at a relatively high bleed rate.

2. A pressure relief valve mechanism comprising:
a valve housing formed with an internal bore which is closed at one end of said housing, said housing having an outlet port and an inlet port communicating with said bore;

a hollow sleeve valve element slidably mounted in said bore and having a reduced diameter portion which is normally positioned therein to block fluid flow from said inlet port to said outlet port;

a valve seat member having a valve opening therein and extending transversely across said bore and providing a pressure relief chamber between said valve seat member and said sleeve valve element, said valve housing having flow passage therein communicating said outlet port with said valve opening;

a ball valve element normally seated on said valve seat member and thereby closing off communication between said pressure relief chamber and said flow passage;

a single spring means biasing said hollow sleeve valve element and said ball valve element to normally closed seated positions;

flow restrictive orifice means provided in the reduced diameter portion of said hollow sleeve valve element and communicating said inlet port with said pressure relief chamber;

means responsive to a predetermined level of inlet pressure to unseat said ball valve element and permit fluid flow from the inlet port through said pressure relief chamber and flow passage to the outlet port at a relatively slow bleed rate; and means responsive to a level of inlet pressure higher than said predetermined level to induce a pressure differential across said hollow sleeve valve element acting against the biasing action of said spring means to unseat said hollow sleeve valve element and thereby permit fluid flow between said inlet and outlet ports at a relatively high bleed rate.

3. A pressure relief valve mechanism as described in claim 2 wherein said means responsive to a predetermined level of inlet pressure to unseat said ball valve element includes:

a Belleville spring diaphragm assembly extending transversely across said bore and adapted to deflect in correspondence with said predetermined level of inlet pressure; and a stem means carried by said diaphragm assembly for contacting and unseating said ball valve element at a degree of deflection of said diaphragm assembly corresponding to said predetermined level of inlet pressure.

4. A pressure relief valve mechanism comprising:
a valve housing formed with an internal bore which is closed at one end of said housing, said housing having an outlet port and an inlet port communicating with said bore;

a hollow sleeve valve element slidably mounted in said bore and having a reduced diameter portion which is normally positioned in said bore to block fluid flow from said inlet port to said outlet port;

a valve seat member having a valve opening therein and extending transversely across said bore, said valve seat providing a first chamber between said valve seat member and said sleeve valve element;

a diaphragm means of greater area than said valve opening disposed transversely in said bore intermediate said valve seat member and said one end of said housing, thereby providing a second pressure chamber between said diaphragm means and valve seat member, and a third chamber between said diaphragm means and said one end of said housing;

a ball valve element normally seated on said valve seat member and thereby closing off communication between said first and second chambers;

a single spring means biasing said hollow sleeve valve element and said ball valve element to closed seated positions;

first flow passage means in said valve housing communicating said outlet port with said second chamber;

second flow passage means communicating said inlet port with said third chamber, whereby said diaphragm means is sensitive to the pressure differential between the pressures at said inlet and outlet ports and is adapted to deflect in correspondence with the magnitude of said pressure differential;

restrictive orifice means provided in the reduced diameter portion of said hollow sleeve valve element and communcating said inlet port with the chamber formed in said bore between the hollow sleeve valve element and said valve seat member;

stem means carried by said diaphragm means for contacting and unseating said ball valve element at a degree of deflection of said diaphragm means corresponding to a predetermined level of inlet pressure, thereby permitting flow through said orifice means and said first and second chambers to the outlet port at a relatively slow bleed rate, said sleeve valve element being responsive to a level of inlet pressure which is higher than said predetermined level to move against the biasing action of said spring means and thereby permit fluid flow between inlet and outlet ports at a relatively high bleed rate.

5. A pressure relief valve mechanism as described in claim 4 wherein said diaphragm means is a Belleville springs diaphragm assembly.

References Cited

UNITED STATES PATENTS

| | | | |
|---|---|---|---|
| 231,214 | 8/1880 | Curtis | 251—28 XR |
| 398,841 | 3/1889 | Mayer | 251—28 XR |
| 633,662 | 9/1899 | Schneible | 137—491 |
| 2,622,611 | 12/1952 | Stark | 137—491 XR |
| 2,882,922 | 4/1959 | Schindel | 137—491 |
| 3,265,303 | 8/1966 | Harris | 137—491 XR |

FOREIGN PATENTS 61,632 4/1951 France.

M. CAREY NELSON, *Primary Examiner.*

R. J. MILLER, *Assistant Examiner.*